Feb. 15, 1966   D. L. SMITH   3,235,263
HOLLOW TOY BLOCK
Filed Feb. 5, 1963

Dorothy L. Smith
INVENTOR.

BY *Clarence A. O'Brien*
and *Harvey B. Jackson*
Attorneys

United States Patent Office 3,235,263
Patented Feb. 15, 1966

3,235,263
HOLLOW TOY BLOCK
Dorothy L. Smith, 3023 Sierra Drive NE.,
Albuquerque, N. Mex.
Filed Feb. 5, 1963, Ser. No. 256,435
4 Claims. (Cl. 273—156)

This invention primarily relates to a toy which will not only provide recreation and entertainment for a child, but is primarily designed to be used by a child of preschool age for educational purposes.

In brief, the invention contemplates a multi-sided enclosure, such as a cube or the like which is hollow, all the sides of which offer a definite play purpose for the child. The cube acts as a mounting structure for different games, and its utility only being limited by the imagination of the child himself. More specifically, two sides of the cube are provided with indentations of various different geometrical configurations wherein blocks corresponding to the various geometrical indentations are adapted to be inserted into the corresponding indentation. In this manner, the child is taught to recognize the different geometrical shapes and further is encouraged to develop his thinking processes by the matching of said different geometrical shaped blocks with the various geometrical indentations formed in the sides of said cube. The cube also mounts a mirror structure which the child may use for his recreational and entertainment purposes. Other means disposed on other sides of said cube include structure for coordinating the sight and hands of a child. Such structure includes an aperture formed through one side of said cube and a transparent side wall of said cube disposed opposite thereto. The child may peer through said transparent side of said cube to see objects which have been placed within said cube since it is hollow, and then may place his hand through said opening while still peering through said transparent side of said cube to see if he can grasp said object and pull it through said aperture. The cube is further made of lightweight plastic wherein a child may move the cube from place-to-place and may rotate the cube thus bringing other objects into view through said transparent side. The cube also embodies on another side thereof a hemispherical indentation which may serve as a seat for the child or said indentation may be filled with water, wherein said child may float objects in the water placed within said indentation. Since the cube is hollow, many of the child's playthings may be stored within the cube.

Accordingly, it is the primary object of this invention to provide a child's toy which has a multiplicity of practical uses as well as natural means for encouraging a child to put the toy to an endless unmber of imaginative childish uses.

A further object of this invention is to provide a toy of the character indicated which may be put to not only recreational purposes, but also to educational purposes for a child of preschool age.

A still further object of this invention is to provide a toy which is made of durable, unbreakable plastic, yet strong and light in weight so that it is completely portable for even the smallest child.

A still further object of this invention is to provide a toy of the character indicated which comprises a hollow mounting cube for mounting a plurality of games in a compact, unitary unit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
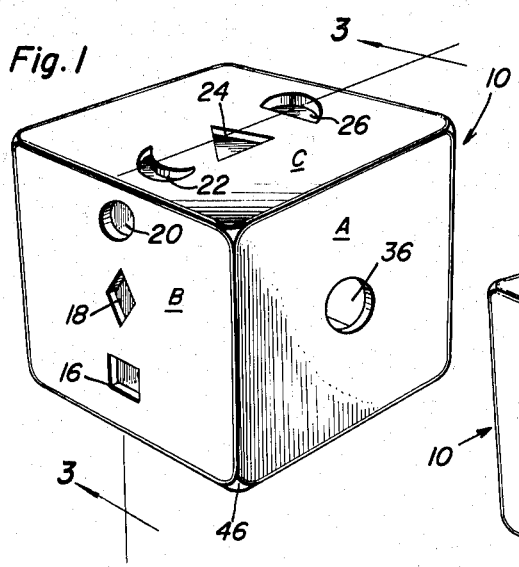
FIGURE 1 is a perspective view of the cube comprising the toy of the instant invention and showing three sides thereof.

Referring now to the drawing in detail, the toy of the instant invention comprises a hollow cube 10 which may be formed of any suitable unbreakable plastic material which is light in weight. Due to the material utilized the cube is rendered portable even for the smallest child. The sides of the cube, generally designated by the letters A–F, each has a definite play purpose for the child as will be described hereinafter.

Figure 4:
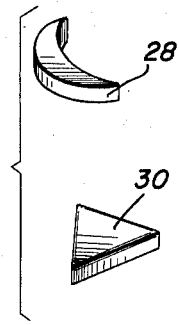
FIGURES 4 and 5 illustrate various geometrically shaped blocks which may be utilized with the geometrically shaped indentations disposed on two sides of said cube.
Figure 5:
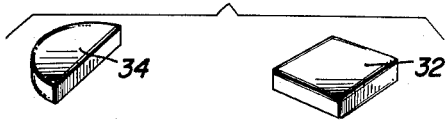

The sides B and C are formed with indentations generally referred to by the numerals 12 and 14 respectively, which are formed of various geometrical shapes. As is apparent from FIGURE 1 these shapes may include, but are not limited to, a square 16, a diamond 18, a circle 20, a crescent 22, a triangle 24, and a semi-circle 26. These indentations are closed at one end to the interior of the hollow cube, but are open at their other ends, for the reception of similarly shaped blocks, as shown in FIGURES 4 and 5 and which may comprise a crescent saped block 28, a triangular shaped block 30, a square or diamond shaped block 32, and a semi-circular shaped block 34. It should now be apparent that the child will take each of the blocks 28, 30, 32 and 34 or the like and attempt to place said blocks into the various indentations disposed on the surfaces B and C of the cube. Said blocks will fit in the various indentations but are of a greater vertical height than the depth of the indentations so that said blocks may be readily removed. The child will attempt to force the blocks into an indentation which he thinks conformeds to the shape of the block. It will be seen that in this manner the child can be taught the various geometrical shapes and also will be forced to use his mental processes in the operation.

Figure 2:
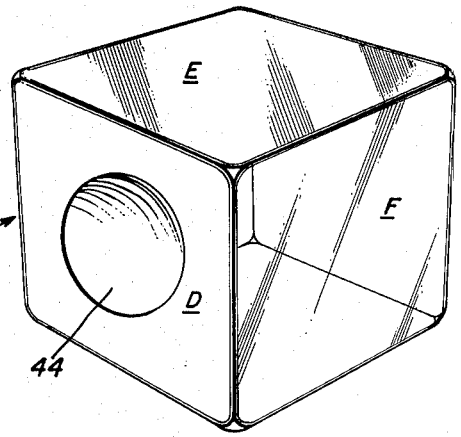
FIGURE 2 is a perspective view of the cube showing the other three sides thereof.
Figure 3:
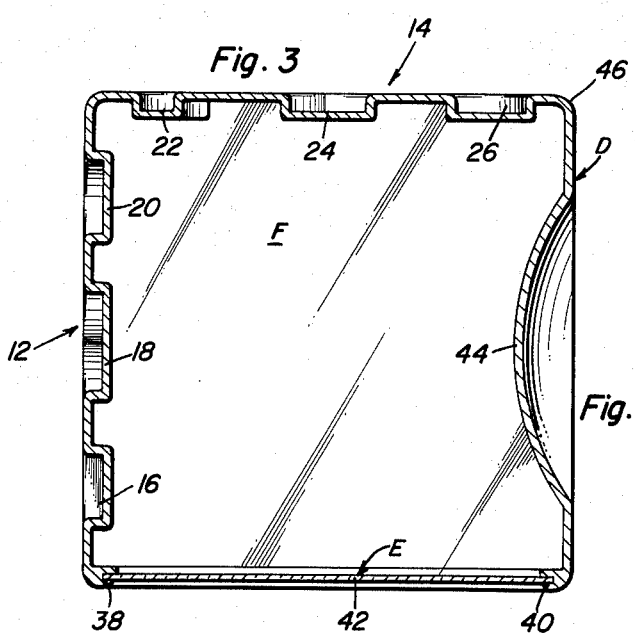
FIGURE 3 is a sectional view taken substantially along line 3—3 of FIGURE 1 and illustrating certain details of the structure of the toy.

The sides A and F are provided with means for coordinating a child's sight and hands. Centrally disposed in side A and formed through said side is a circular aperture generally designated by the numeral 36, large enough for a child to place his hand through and gain access to the interior of the hollow cube but yet small enough to prevent a child from sticking his head therein. Oppositely disposed to said side A is a side F which is shown in FIGURE 2 as being formed from a transparent plastic material, whereas the other sides are not transparent. The child may view objects placed within the interior of the cube through the transparent window or side F then may attempt to remove said objects from the interior of said cube through the opening or aperture 36, thus rendering an effective means for teaching the coordination of a child's sight and hands. Furthermore, various child's playthings may be stored within the interior of the cube and removed through the opening 36 and the child may be occupied in a fascinating fashion by locating items within the interior of the cube by turning the cube from side-to side, thereby bringing new objects into view at each turn.

Side E of the cube is slotted as shown at 38 and 40 for the reception of a mirror element such as shown at 42. The mirror may be utilized for recreational and educational purposes. The mirror furnishes the child with a surface into which he can make funny faces at himself or may be utilized to shine a spot on the walls or the ceiling from a light reflecting on the mirror, thus making the child aware of various properties of light.

Side D is provided with a hemispherical indentation shown at 44 which may be used by the child for various purposes. For example, the child may use the indentation as a sunken seat and thus use the cube as a stool, or the child can roll or swirl any round objects such as balls or marbles in the concave identation just to see them whirl around and to hear the special kind of sound they make. The child can also fill said concave indentation with water and use it as a basin and float objects therein. Lastly, it may occur to the child to place the cube upon his head and because of the indentation, the child could walk around with the large cube remaining in place on top of his head.

It should also be noted, that all sharp edges or corners have been removed from the cube, so as to prevent the child from harming himself by any of such protruding sharp edges. This is shown at 46 wherein all the corners have been rounded.

It should now be apparent that a unique mounting structure for a plurality of games or other devices has been compactly assembled, which games may serve not only recreational purposes but educational purposes. Furthermore, the mounting structure has been made completely safe and portable. It should also be apparent that the uses of the devices are unlimited, only bounded by the child's imagination and is of a simple and efficient construction.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A multipurpose child's toy comprising an enlarged article receiving hollow cube having six substantially planar sides arranged in three pairs of opposed sides, a first side of a first one of said pairs being transparent and constituting the sole transparent side, said transparent side being planar and forming a window so as to enable a viewing of the interior of the hollow cube, and the opposed second side of the first pair of sides having an aperture therethrough of a size so as to enable the introduction of a child's hand therethrough into the interior of the hollow cube, the opposed window and aperture cooperating to form a coordinating device requiring a viewing of the interior of the cube through one side thereof and a manual manipulation of any articles therein through the opposite side, each of the remaining sides incorporating integral amusement features.

2. The device of claim 1 wherein the amusement feature on one of the remaining sides comprises a single centrally located concave seat formed therein.

3. The device of claim 2 wherein the amusement feature on a second of the remaining sides consists of a mirror.

4. The device of claim 3 wherein the amusement features on the last two remaining sides each comprises a plurality of different geometrically shaped indentations therein.

References Cited by the Examiner

UNITED STATES PATENTS

| | | | |
|---|---|---|---|
| 588,688 | 8/1897 | Warner | 273—115 |
| 898,833 | 9/1908 | Chapman | 273—108 |
| 1,403,196 | 1/1922 | Rasely | 46—24 |
| 2,574,257 | 2/1926 | Redner. | |
| 2,631,747 | 3/1953 | Stolte | 46—25 X |
| 2,659,163 | 11/1953 | Albee. | |
| 2,747,297 | 5/1956 | Zalkind | 46—1 |
| 2,747,324 | 5/1956 | Zalkind. | |
| 2,940,760 | 6/1960 | Brinkman | 46—24 X |
| 2,985,451 | 5/1961 | Sims | 46—1 X |

FOREIGN PATENTS

| | | |
|---|---|---|
| 887,473 | 8/1953 | Germany. |

RICHARD C. PINKHAM, *Primary Examiner.*